United States Patent [19]
Irino

[11] Patent Number: 5,094,085
[45] Date of Patent: Mar. 10, 1992

[54] REFRIGERATING CYCLE APPARATUS WITH A COMPRESSOR HAVING SIMULTANEOUSLY DRIVEN TWO COMPRESSOR MEANS

[75] Inventor: Yasumi Irino, Fuji, Japan

[73] Assignee: Kabushiki Kaisha Toshiba, Kawasaki, Japan

[21] Appl. No.: 697,596

[22] Filed: May 9, 1991

[30] Foreign Application Priority Data

May 15, 1990 [JP] Japan .................................. 2-125168

[51] Int. Cl.$^5$ .............................................. F25B 1/10
[52] U.S. Cl. ...................................... 62/175; 62/196.2; 62/227; 62/228.3; 62/510; 62/513; 236/1 EA
[58] Field of Search ...................... 62/196.1, 175, 196.2, 62/196.3, 510, 113, 513, 228.1, 228.3, 228.5, 227; 236/1 EA

[56] References Cited

U.S. PATENT DOCUMENTS

| | | | |
|---|---|---|---|
| 4,938,029 | 7/1990 | Shaw | 62/228.5 X |
| 5,046,325 | 9/1991 | Kawahara | 62/510 X |
| 5,050,233 | 9/1991 | Hitosugi et al. | 62/510 X |

FOREIGN PATENT DOCUMENTS

62-30693 8/1987 Japan .
63-212797 9/1988 Japan .

*Primary Examiner*—Harry B. Tanner
*Attorney, Agent, or Firm*—Cushman, Darby & Cushman

[57] ABSTRACT

A refrigerating cycle apparatus has, in a sealed casing, a compressor including first and second compressor means driven simultaneously. A refrigerating cycle circuit is constituted by connecting this compressor, a condenser, a pressure-reducing device, and an evaporator. Counterflow checking means is provided on the suction side of the first compressor means, for checking the counterflow of the refrigerant from the first compressor means to the evaporator. Switching means is provided on the discharge side of the second compressor means. The switching means is operated such that the refrigerant gas compressed by the second compressor means is let to flow into the sealed casing to perform a parallel compression operation with use of the first and second compressor means, and the refrigerant gas compressed by the second compressor means is let to flow from the downstream side of the counterflow checking means to the suction side of the first compressor means, thereby performing a two-stage compression operation in which compression is performed first by the first compressor means and then by the second compressor means. The capacity variable range of the compressor can be increased with a simple structure including one counterflow checking means and one switching means.

13 Claims, 4 Drawing Sheets

REFRIGERATING CYCLE APPARATUS WITH A COMPRESSOR HAVING SIMULTANEOUSLY DRIVEN TWO COMPRESSOR MEANS

BACKGROUND OF THE INVENTION

1. Field of the Invention

The present invention relates generally to a refrigerating cycle apparatus with a compressor having two compressor means in a sealed casing, and more particularly to an improvement of the structure for feeding-/discharging a refrigerant gas into/from each compressor means.

2. Description of the Related Art

A refrigerating cycle apparatus comprises a compressor for sucking and compressing a refrigerant gas; a condenser for condensing and liquefying the refrigerant gas pressurized by the compressor; a pressure-reducing device for reducing the pressure of the refrigerant liquefied by the condenser; and an evaporator for evaporating the pressure-reduced liquid refrigerant, which has been pressure-reduced by the pressure-reducing device, thus effecting a refrigerating operation. These elements are successively connected via a refrigerant pipe.

The compressor may have various structures. According to one of the structures, two compressor means are contained in a sealed casing, and these two compressor means are connected to, and driven simultaneously by, a single motor unit.

For example, Published Examined Japanese Utility Model Application No. 62-30693 discloses a refrigerating cycle with a compressor having two compressor means.

This refrigerating cycle employs a higher-stage injection system wherein an intermediate economizer in a two-stage compressor is simplified. The advantage of this cycle is the protection of the higher-stage part.

However, in a compressor required in a cooling cycle apparatus, a wide range of refrigerating cycle loads are applied. It is thus required that the refrigeration capacity of the compressor be variable. In this respect, the two-stage compression compressor is not satisfactory.

Under the situation, for example, Published Unexamined Japanese Patent Application No. 63-212797 proposed a compressor wherein first compressor means and second compressor means having two cylinders (large and small cylinders) with different compression volumes are housed within a sealed casing.

Gas opening/closing means is provided at the suction side and discharge side of each compressor means, and the two gas opening/closing means are connected via a refrigerant pipe.

The first and second compressor means are driven simultaneously. The gas opening/closing means are switched to provide three drive modes: 1) independent compression drive mode in which the large and small cylinders (two cylinders) perform compression operations independently, 2) parallel compression drive mode in which the cylinders perform compression operations in parallel, and 3) series-compression drive mode in which the compression operation is performed over two stages from one cylinder to the other cylinder.

With this compressor, the range of variable capacity is remarkably increased, and the requirements for refrigerating cycle loads over the almost entire range can be satisfied.

In the above compressor, however, the number of gas opening/closing means is large, and the control means for controlling the gas opening/closing means is complicated accordingly.

In addition, because of many gas opening/closing means, the pipe for connecting them becomes longer, and the size of the entire apparatus is increased.

SUMMARY OF THE INVENTION

The present invention has been made in consideration of the above circumstances and its object is to provide a refrigerating cycle apparatus capable of increasing a refrigeration capacity variable range by use of two compressor means. In this apparatus, refrigerant gas switching/guiding means is simplified, and the size of the apparatus is reduced with high performance.

In order to achieve the above object, there is provided a refrigerating cycle apparatus with a compressor having two compressor means driven simultaneously, comprising: a compressor having first compressor means and second compressor means in a sealed container, said first and second compressor means being driven simultaneously and sucking refrigerant gas; a refrigerating cycle circuit including a condenser for condensing and liquefying the refrigerant gas compressed and pressurized by the compressor, a pressure-reducing device for pressure-reducing the refrigerant liquefied by the condenser, an evaporator for evaporating for the pressure-reduced refrigerant, and said compressor, which condenser, pressure-reducing device, evaporator and compressor are successively connected between the refrigerant gas discharge side and suction side of the compressor; counterflow checking means, provided on the suction side of the first compressor means, for checking the counterflow of the refrigerant from the first compressor means to the evaporator; and switching means, provided on the discharge side of the second compressor means, for selecting one of two discharge directions of the refrigerant gas, wherein the switching means is operated such that the refrigerant gas compressed by the second compressor means is let to flow into the sealed casing, thereby performing a parallel compression operation, and the refrigerant gas compressed by the second compressor means is let to flow from the downstream side of the counterflow checking valve to the suction side of the first compressor means, thereby performing a two-stage compression operation in which compression is performed first by the first compressor means and then by the second compressor means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 and 2 show a refrigerating cycle apparatus according to an embodiment of the invention, in which

DETAILED DESCRIPTION OF THE PREFERRED EMBODIMENTS

Embodiments of the present invention will now be described with reference to the accompanying drawings.

Figure 1:
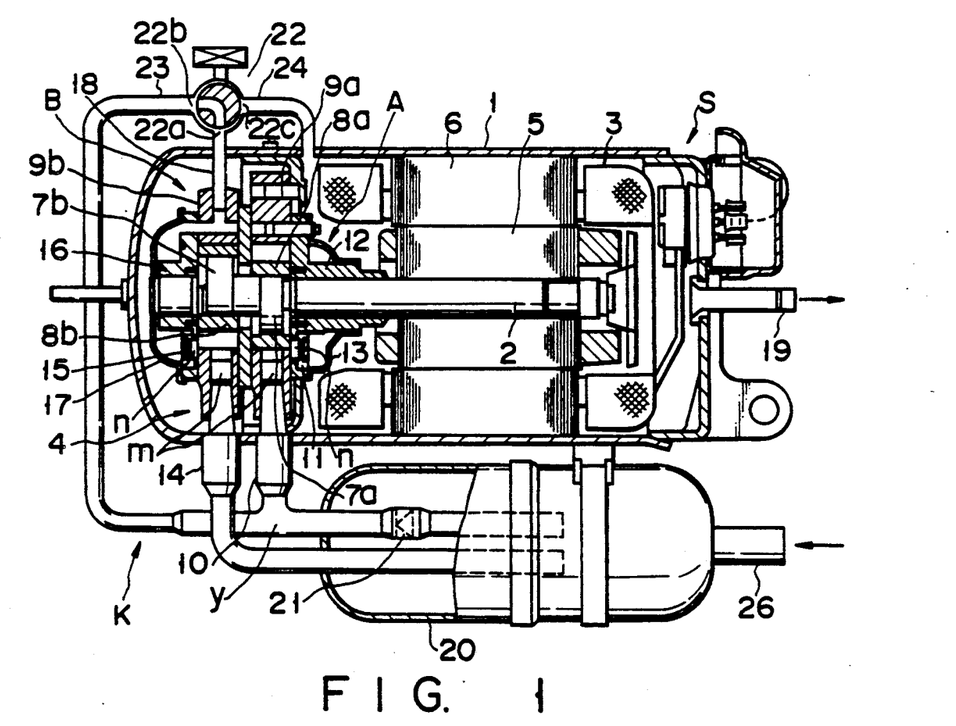
FIG. 1 is a vertical cross-sectional view of a compressor and an accumulator.

FIG. 1 shows a compressor S, an accumulator 20 and part of a refrigerating cycle circuit K employed in a refrigerating cycle apparatus.

Within a sealed casing 1, a motor unit 3 and compressor means 4 are provided. The motor unit 3 and compressor means 4 are coupled by a rotary shaft 2.

The motor unit 3 comprises a rotor 5 fitted on the rotary shaft 2, and a stator 6 provided with a small gap between itself and the rotor 5.

The compressor means 4 comprises first compressor means A and second compressor means B which are situated adjacent to each other along the rotary shaft 2.

The first and second compressor means A and B will now be described.

Crank portions 7a and 7b, which are eccentric in opposite directions, are formed integrally on the rotary shaft 2, and rollers 8a and 8b are fitted on the crank portions 7a and 7b.

The rollers 8a and 8b are contained in cylinders 9a and 9b having suction ports m and discharge ports n, so as to be eccentrically rotatable.

Specifically, the first and second compressor means A and B are constituted by so-called rotary compressor mechanisms.

A first suction refrigerant pipe 10 penetrating the sealed casing 1 from outside is connected to the suction port m of the first compressor means A.

A discharge valve 11 is provided at the discharge port n of the first compressor means A. The gas discharged from the valve 11 is led into the sealed casing 1 through a valve cover 13.

The valve cover 13 is provided on a main bearing 12 for rotatably supporting the rotary shaft 2.

A second suction refrigerant pipe 14 penetrating the sealed casing 1 from outside is connected to the suction port m of the second compressor means B.

A discharge valve 15 is provided at the discharge port n of the second compressor means B. The gas discharged from the valve 15 is temporarily filled in a valve cover 17 provided on a sub-bearing 16.

The sub-bearing 16, along with the cylinders 9a and 9b, is fixed on the main bearing 12, thereby rotatably supporting the end portion of the rotary shaft 2.

An intermediate discharge pipe 18 penetrating the sealed casing 1 from outside is connected to the cylinder 9b. The refrigerant gas discharged to the valve cover 17 is led to the outside of the sealed casing 1.

A discharge refrigerant pipe 19 is connected to the side face of the sealed casing 1, thereby leading the gas filled in the sealed casing 1 to the outside.

An accumulator 20 for separating the refrigerant into gas and liquid components is provided adjacent to the compressor S.

End portions of the first and second suction refrigerant pipes 10 and 14 are inserted into the accumulator 20.

A check valve 21 serving as counterflow checking means is provided on only the first suction refrigerant pipe 10 inserted in the accumulator 20.

The check valve 21 does not check the flow of gas from the accumulator 20 towards the first compressor means A, but checks the flow of gas from the first compressor means A towards the accumulator 20.

An end portion of the intermediate discharge pipe 18 is connected to a suction port 22a of an electromagnetic three-way valve 22.

A first discharge port 22b of the three-way valve 22 is connected to a compressor means connection pipe 23 communicating with a midway portion of the first suction refrigerant pipe 10.

The location y where the compressor means connection pipe 23 is connected to the first suction refrigerant pipe 10 must be set between the suction side of the first compressor means A and the check valve 21.

The location y is on the downstream side of the check valve 21, as viewed from the refrigerant was sucked from the accumulator 20 to the first compressor means A.

A second discharge port 22c of the electromagnetic three-way valve 22 is connected to a casing connection pipe 24 having one end communicating with the inside of the sealed casing 1.

Thus, the refrigerant gas compressed and discharged by the second compressor means B is led to either the compressor means connection pipe 23 or casing connection pipe 24 by the switching operation of the electromagnetic three-way valve 22.

For example, the refrigerant gas led to the compressor means connection pipe 23 is prevented from flowing into the accumulator 20 by means of the check valve 21, and is sucked into only the first compressor means A via the first suction refrigerant pipe 10.

The refrigerant gas led to the casing connection pipe 24 is directly introduced into the sealed casing 1.

Figure 2:
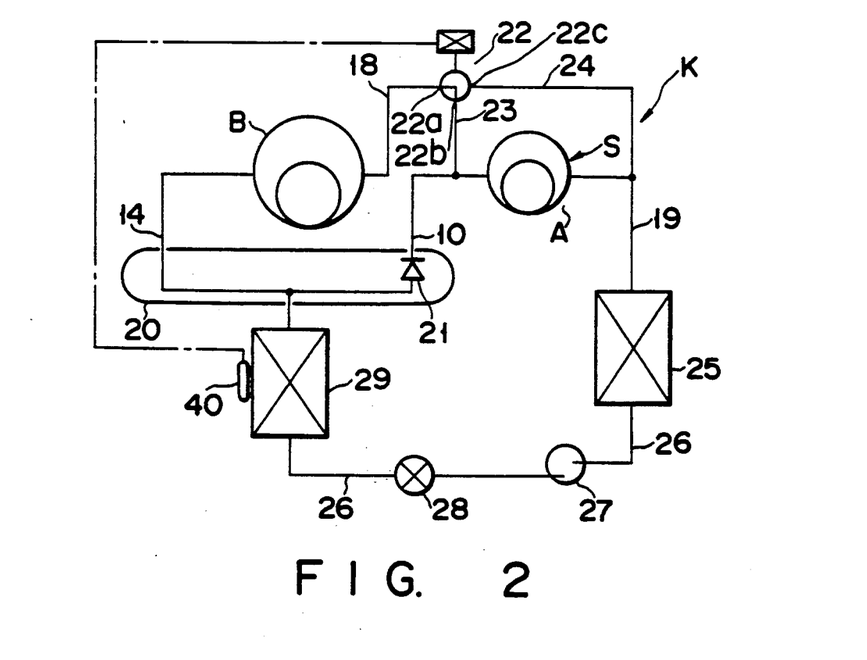
FIG. 2 is a schematic view of a refrigerating cycle circuit.

The compressor S and accumulator 20 are connected to a refrigerating cycle circuit K, as shown in FIG. 2.

In FIG. 2, the sealed casing 1 of the compressor S is omitted, and the piping construction shown in FIG. 1 is simplified.

The discharge refrigerant pipe 19 is connected to a condenser 25, and also successively to a liquid tank 27, a refrigerant control valve 28 serving as a pressure-reducing device and an evaporator 29 via a refrigerant pipe 26. The evaporator 29 communicates with the suction side of the accumulator 20.

The electromagnetic three-way valve 22 is electrically connected to a temperature sensor 40 for sensing the temperature of the evaporator 29. When the sense signal from the sensor 40 has a level equal to or lower than a predetermined value, the intermediate discharge pipe 18 is caused to communicate with the compressor means connection pipe 23.

When the sense signal from the sensor 40 has a level higher than the predetermined value, the intermediate discharge pipe 18 is caused to communicate with the casing connection pipe 24.

The operation of the refrigerating cycle apparatus having the above structure will now be described.

The temperature sensor 40 senses the temperature of the evaporator 29. When the sensed temperature is higher than the predetermined value, that is, when the refrigerating cycle load is higher than the predetermined value, the electromagnetic three-way valve 22 which has received the sense signal from sensor 40 is operated so as to cause the intermediate discharge pipe 18 to communicate with the casing connection pipe 24.

The refrigerant is evaporated in the evaporator 29 to effect refrigeration. Then, the evaporated refrigerant, which has been separated into gas/liquid components in the accumulator 20, is sucked and compressed in the first and second compressor means A and B via the first and second suction refrigerant pipes 10 and 14.

The pressurized gas compressed in the first compressor means A is directly discharged into the sealed casing 1 via the valve cover 13.

The pressurized refrigerant gas compressed in the second compressor means B is guided from the intermediate discharge pipe 18 to the casing connection pipe 24 via the electromagnetic three-way valve 22 and then discharged into the sealed casing 1.

Thus, the pressurized gas compressed by and discharged from the first and second compressor means A and B is joined in the sealed casing 1.

The pressurized refrigerant gas in the sealed casing 1 is discharged to the discharge refrigerant pipe 19 and guided to the condenser 25. In the condenser 25, the gas is condensed and liquefied.

The refrigerant liquefied by the condenser 25 is collected temporarily in the liquid tank 27 and is then pressure-reduced by the refrigerant control valve 28.

The liquid refrigerant, which has been pressure-reduced by the refrigerant control valve 28, is evaporated in the evaporator 29, and absorbs ambient evaporation latent heat, thus effecting refrigeration.

The refrigerant evaporated by the evaporator 29 is returned to the accumulator 20, and circulated in the refrigerating cycle circuit K, as stated above.

As has been described above, when the refrigerating cycle load is higher than a predetermined value, the first and second compressor means A and B of compressor S perform a parallel compression operation at a maximum capacity.

In particular, by performing the maximum capacity operation when the refrigerating cycle operation is started or when the refrigerating cycle load increases sharply, the load can be decreased very quickly.

However, if the maximum capacity operation is continued for a long time, the heat load of the evaporator 29 decreases gradually and the evaporation pressure of the refrigerant lowers. Where the apparatus of this invention is applied to a low-temperature refrigerator, the suction pressure of the compressor S lowers below the atmospheric pressure.

In addition, the quantity of the refrigerant gas circulating in the refrigerating cycle circuit K and the capacity for cooling the motor unit 3 decrease, and the high compression-ratio operation and the overheat operation go on simultaneously.

When the temperature of the evaporator 29 sensed by the temperature sensor 40 is equal to or lower than the predetermined value, that is, the refrigerating cycle load is equal to or lower than a predetermined value, the electromagnetic three-way valve 22, which has received the sense signal from the sensor 40, is switched to cause the intermediate discharge pipe 18 and compressor means connection pipe 23 to communicate with each other.

The refrigerant gas evaporated by the evaporator 29 and separated into gas/liquid components by the accumulator 20 is not led to the first suction refrigerant pipe 10 but only to the second suction refrigerant pipe 14, by virtue of the operation (described later) of the check valve 21 associated with the operation of the electromagnetic three-way valve 22.

The refrigerant gas is sucked into the second compressor means B from the second suction refrigerant pipe 14, and the gas is compressed and discharged to the intermediate discharge pipe 18 as intermediate pressurized gas.

The gas is then guided to the first suction refrigerant pipe 10 through the compressor means connection pipe 23 selected by the three-way valve 22.

The check valve 21 is closed by the gas flow from the compressor means connection pipe 23, thereby checking the flow to the accumulator 20 and evaporator 29.

All intermediate pressurized gas is sucked into the first compressor mean A from the first suction refrigerant pipe 10, and is compressed.

Finally, the refrigerant gas is compressed in two stages, first by the second compressor means B and then by the first compressor means A. The compressed gas is discharged into the sealed casing 1, and is circulated in the refrigerating cycle circuit K from the discharge refrigerant pipe 19, as described above.

Compared to the parallel compression operation, the two-stage compression operation is inferior in refrigeration capacity. However, the operation efficiency thereof increases by a degree corresponding to the decrease in compression ratio, and the compression efficiency increases.

Further, the compression heat loss decreases, the overheat gas decreases, the volumetric efficiency increases, and the refrigeration capacity recovers.

When the two-stage compression operation is performed, the refrigeration capacity decreases, the motor output of the motor unit 3 decreases, and the motor overheat can be prevented. On the other hand, compared to the normal one-stage compression operation, the motor torque pulsation is decreased, resulting in less operation noise.

In particular, in a refrigerating cycle apparatus such as a low-temperature refrigerator using Freon 22 as refrigerant gas, the vaporization pressure becomes lower than the atmospheric pressure when the vaporization temperature of refrigerant gas is $-40°$. Thus, vacuum operation is carried out.

In this case, if the two-stage compression operation is performed, the overheat of the compressor S can be prevented effectively, the compression efficiency is improved, and the mechanical efficiency is increased by reduction of bearing load. In addition, operation noise is lowered. Thus, a highly efficient low-temperature refrigerating cycle operation can be performed.

Figure 3:
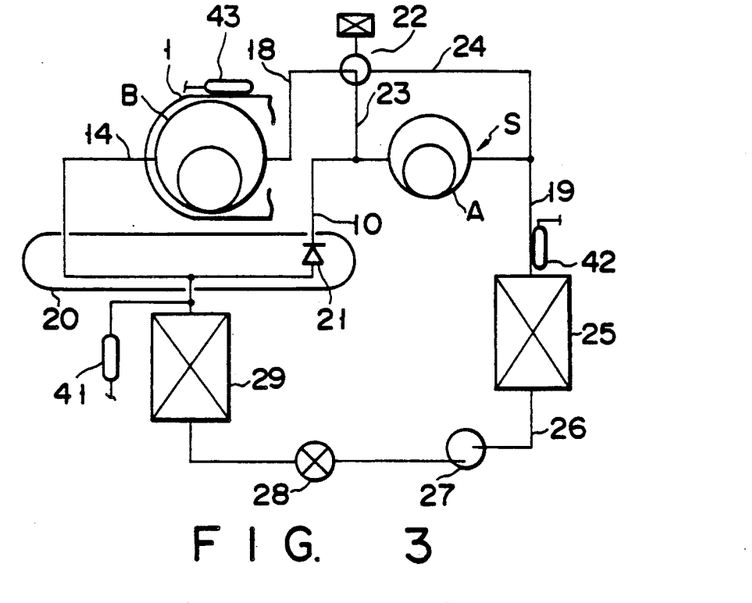
FIGS. 3 to 7 show refrigerating cycle circuits or parts thereof according to other embodiments of the invention.

As is shown in FIG. 3, the electromagnetic three-way valve 22 may be electrically connected to any one of a pressure sensor 41 for sensing the suction pressure of the compressor S, a temperature sensor 42 for sensing the discharge gas temperature of the compressor S, and a temperature sensor 43 for sensing the temperature of the sealed casing 1 of the compressor S.

More specifically, the electromagnetic three-way valve 22 can perform not only the switch control on the basis of the sense signal from the temperature sensor 40 (FIG. 2) for sensing the temperature of the evaporator 29, but also the switch control on the basis of the sense signal from any one of the sensors 41, 42 and 43.

Figure 4:
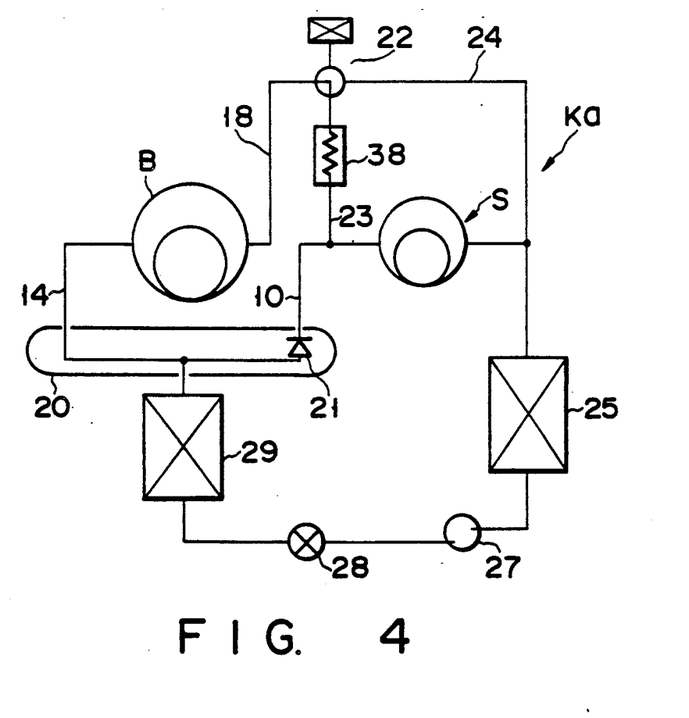

According to an embodiment shown in FIG. 4, a refrigerating cycle circuit Ka includes an intermediate cooling device 38 for cooling the refrigerant gas by means of air or water. The cooling device 38 is provided midway along the compressor means connection pipe 23 connected to the electromagnetic three-way valve 22.

The gas, which has been compressed by the second compressor means B and let to flow from the three-way valve 22 to the compressor means connection pipe 23, is cooled intermediately by the intermediate cooling device 38.

The cooled gas is then supplied to the higher-stage first compressor means A. The temperature of the gas is decreased and the overheating thereof is prevented.

Figure 5:
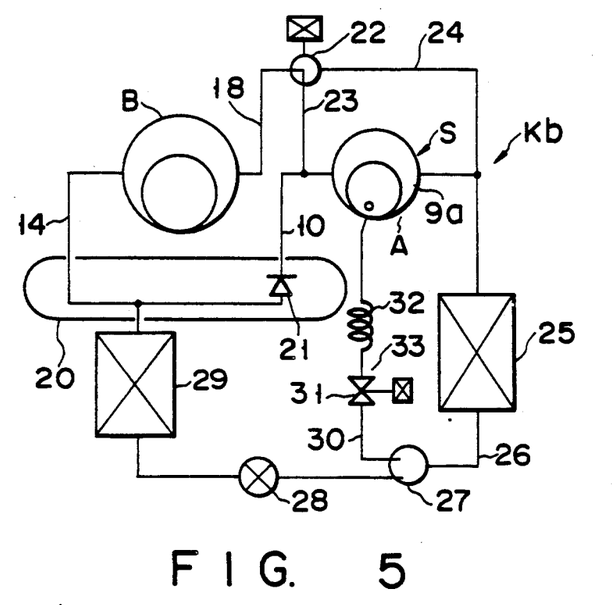

According to an embodiment of FIG. 5, a liquid injection circuit 33 is added to a refrigerating cycle circuit Kb.

The liquid injection circuit 33 is constituted by connecting the liquid tank 27 and the cylinder 9a of first compressor means A by a bypass pipe 30, and providing an electromagnetic opening/closing valve 31 and an auxiliary capillary tube 32 serving as an auxiliary pressure-reducing device midway along the bypass pipe 30.

When the compressor S performs the two-stage compression operation, the electromagnetic opening/closing valve 31 of the liquid injection circuit 33 is opened in synchronism with the switching of the electromagnetic three-way valve 22.

Part of the liquid refrigerant in the liquid tank 27 is supplied to the liquid injection circuit 33 and is injected directly into the cylinder 9a of the first compressor means A through the electromagnetic opening/closing valve 31 and auxiliary capillary tube 32.

In this embodiment, the first compressor means A is provided on the higher stage side. The compression gas on the higher stage side is effectively cooled by the liquid refrigerant injected from the liquid injection circuit 33. The cooling operation is effectively performed without degrading the performance of the compressor S.

Figure 6:
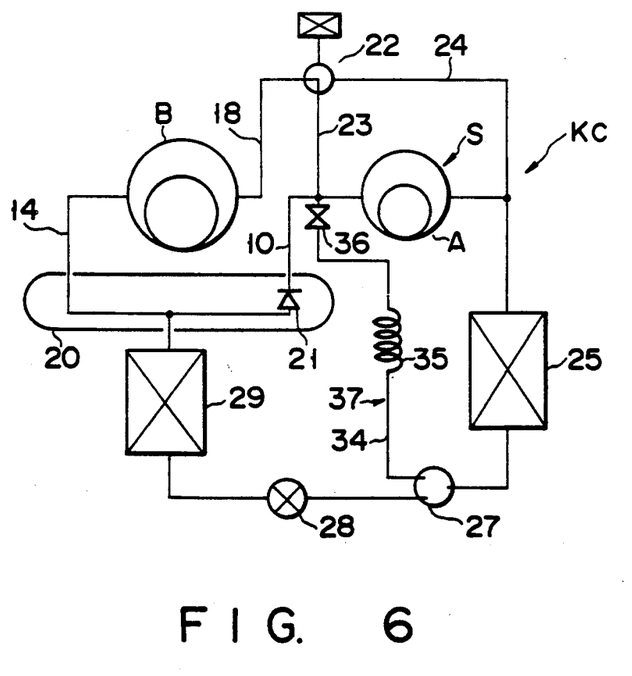

According to an embodiment shown in FIG. 6, a refrigerating cycle circuit Kc is provided with a liquid bypass circuit 37.

The liquid bypass circuit 37 is constituted by connecting the liquid tank 27 and a midway portion of the first suction refrigerant pipe 10 by means of a bypass pipe 34, and providing an auxiliary capillary tube 35 serving as an auxiliary pressure-reducing device and a two-way valve 36 midway along the bypass pipe 34.

The connection part between the bypass pipe 34 and the first suction refrigerant pipe 10 corresponds to the connection part between the compressor means connection pipe 23 and the first suction refrigerant pipe 10.

When the compressor S performs the two-stage compression operation, a two-way valve 36 of the liquid bypass circuit 37 is opened in synchronism with the switching of the electromagnetic three-way valve 22.

Part of the liquid refrigerant in the liquid tank 27 is supplied to the liquid bypass circuit 37, and is mixed with an intermediate pressure refrigerant gas supplied from the compressor means connection pipe 23 to the first compressor means A.

In this embodiment, the first compressor means A is provided on the higher stage side. The compressor means A is effectively cooled by the liquid refrigerant injected from the liquid bypass circuit 37. The cooling operation is effectively performed without degrading the performance of the compressor S.

Unlike the liquid injection circuit 33 shown in FIG. 5, it is not necessary to form an injection port at the cylinder 9a or connect a pipe to the injection port. The compression mechanism is simple, and the cooling effect for the compressor S is excellent.

The present invention is not limited to the above embodiments, and various changes and modifications may be made within the scope of the subject matter of the invention.

Figure 7:
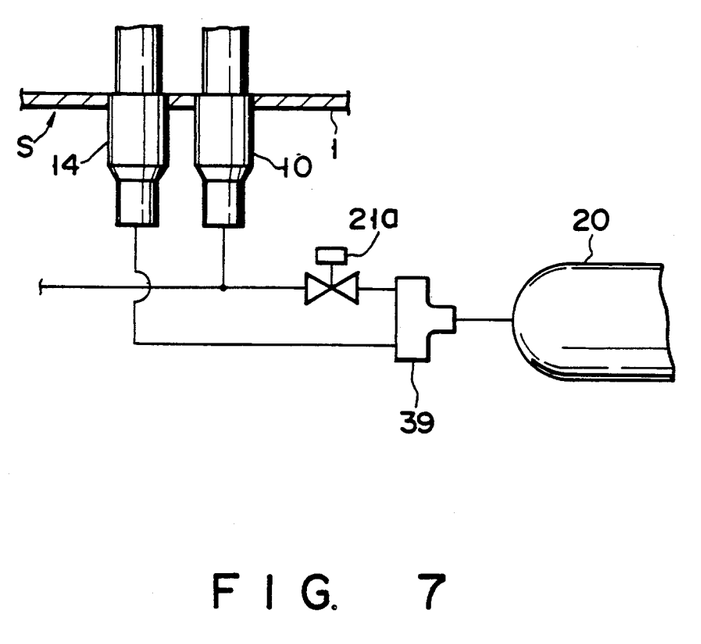

For example, as shown in FIG. 7, the counterflow checking means may be an electromagnetic opening/closing valve 21a. The valve 21a is opened/closed in interlock with switching means. Numeral 39 denotes a flow divider provided outside the accumulator 20.

As a power source for the compressor S, not only a commercial frequency power source but also a power frequency variable type sine-wave inverter power source can be used.

In the case where freon gas is used as refrigerant gas, if evaporation temperature decreases, the suction pressure of the compressor S becomes close to a vacuum pressure and the inside of the refrigerant pipe has a pressure lower than the atmospheric pressure.

Accordingly, it is possible to switch the parallel compression operation to the two-stage compression operation by means of a control valve utilizing a difference between the atmospheric pressure and the pressure in the refrigerant pipe.

What is claimed is:

1. A refrigerating cycle apparatus with a compressor having two compressor means driven simultaneously, comprising a compressor having first compressor means and second compressor means in a sealed container, said first and second compressor means being driven simultaneously and sucking refrigerant gas;

a refrigerating cycle circuit including a condenser for condensing and liquefying the refrigerant gas compressed and pressurized by the compressor, a pressure-reducing device for pressure-reducing the refrigerant liquefied by the condenser, an evaporator for evaporating for the pressure-reduced refrigerant, and said compressor, which condenser, pressure-reducing device, evaporator and compressor are successively connected between the refrigerant gas discharge side and suction side of the compressor;

counterflow checking means, provided on the suction side of the first compressor means, for checking the counterflow of the refrigerant from the first compressor means to the evaporator; and switching means, provided on the discharge side of the second compressor means, for selecting one of two discharge directions of the refrigerant gas, wherein the switching means is operated such that the refrigerant gas compressed by the second compressor mean is let to flow into the sealed casing, thereby performing a parallel compression operation, and the refrigerant gas compressed by the second compressor means is let to flow from the downstream side of the counterflow checking valve to the suction side of the first compressor means, thereby performing a two-stage compression operation in which compression is performed first by the first compressor means and then by the second compressor means.

2. The apparatus according to claim 1, wherein a discharge refrigerant pipe communicating with the condenser is connected to the sealed casing of the compressor, said first compressor means discharges the compressed refrigerant gas directly into the sealed casing, and the second compressor means discharges the compressed refrigerant gas directly to the switching means.

3. The apparatus according to claim 1, wherein said first and second compressor means of the compressor comprise a rotary compressor mechanism including a rotary shaft, a pair of crank members formed integrally with the rotary shaft and eccentrically in opposite directions, rollers fitted on the crank members, and cylinders containing said rollers so as to be rotatable eccentrically and each having a suction port and a discharge port.

4. The apparatus according to claim 1, wherein said counterflow checking means comprises a check valve.

5. The apparatus according to claim 4, wherein said refrigerating cycle circuit has an accumulator between the evaporator and the compressor, which accumulator separates the refrigerant evaporated by the evaporator into gas and liquid components;
   a suction refrigerant pipe communicating with the first compressor means and a suction refrigerant pipe communicating with the second compressor means are inserted into the accumulator; and
   the check valve is provided on the suction refrigerant pipe of the first compressor means located within the accumulator.

6. The apparatus according to claim 1, wherein said counterflow checking means comprises an electromagnetic opening/closing valve.

7. The apparatus according to claim 1, wherein said switching means comprises an electromagnetic three-way valve for changing the refrigerant discharge direction upon receiving an electric signal, said electromagnetic three-way valve having a suction port connected to a discharge refrigerant pipe of the second compressor means, a discharge port connected to a connection pipe communicating with the sealed casing of the compressor, and a discharge port connected to a connection pipe communicating with a downstream side portion of the counterflow checking means.

8. The apparatus according to claim 7, wherein said electromagnetic three-way valve is operated such that, when a refrigerating cycle load is lower than a predetermined value, the refrigerant gas discharged from the second compressor means is led to the suction side of the first compressor means, and when the refrigerating cycle load is equal to or higher than the predetermined value, the refrigerant gas discharged from the second compressor means is led into the sealed casing.

9. The apparatus according to claim 8, wherein said electromagnetic three-way valve is controlled in accordance with a sense signal from any one of a temperature sensor for sensing the temperature of the evaporator, a pressure sensor for sensing the suction pressure of the compressor, a temperature sensor for sensing the temperature of discharge gas from the compressor, and a temperature sensor for sensing the temperature of the sealed casing.

10. The apparatus according to claim 7, further comprising an intermediate cooling device for cooling the compressed refrigerant gas supplied from the second compressor means to the first compressor means, said intermediate cooling device being situated midway along the connection pipe for connecting the discharge port of the three-way valve and the downstream side of the counterflow checking means.

11. The apparatus according to claim 1, wherein the refrigerating cycle circuit is constituted by providing a liquid tank for temporarily collecting the liquid refrigerant from the condenser between the condenser and the pressure-reducing device;
   there is provided a liquid injection circuit in which the liquid tank is directly connected to the first compressor means and an opening/closing valve and an auxiliary pressure-reducing device are arranged midway between the liquid tank and the first compressor means; and
   in the two-stage compression operation, the opening/closing valve is opened to inject part of the liquid refrigerant in the liquid tank directly to the first compressor via the liquid injection circuit, thereby cooling the higher-stage side first compressor means.

12. The apparatus according to claim 1, wherein the refrigerating cycle circuit is constituted by providing a liquid tank for temporarily collecting the liquid refrigerant from the condenser between the condenser and the pressure-reducing device:
   there is provided a liquid bypass circuit in which the liquid tank is directly connected to the suction side of the first compressor means and an opening/closing valve and an auxiliary pressure-reducing device are arranged midway between the liquid tank and the first compressor means; and in the two-stage compression operation, the opening/closing valve is opened to mix part of the liquid refrigerant in the liquid tank with the refrigerant gas led to the first compressor via the liquid bypass circuit, thereby cooling the higher-stage side first compressor means.

13. A refrigerating cycle apparatus with a compressor having two compressor means driven simultaneously, comprising 'a compressor having first compressor means and second compressor means in a sealed container, said first and second compressor means being driven simultaneously by a motor unit and sucking refrigerant gas, said first compressor means discharging the compressed refrigerant gas into the sealed casing, and said second compressor means discharging the compressed refrigerant gas to an intermediate discharge pipe;
   a suction refrigerant pipe connected to the sealed casing of the compressor, and a suction refrigerant pipe connected to the suction side of the first and second compressor means;
   a refrigerating cycle circuit including a condenser for condensing and liquefying the refrigerant gas compressed and pressurized by the compressor, a pressure-reducing device for pressure-reducing the refrigerant liquefied by the condenser, an evaporator for evaporating for the pressure-reduced refrigerant to effect refrigeration, and said compressor, which condenser, pressure-reducing device, evaporator and compressor are successively connected between the discharge refrigerant pipe and each suction refrigerant pipe;
   a check valve, provided on the suction refrigerant pipe of the first compressor means, for checking the counterflow of the refrigerant from the first compressor means to the evaporator; and
   an electromagnetic three-way valve, provided on the discharge refrigerant pipe of the second compressor means, for selecting one of two discharge directions of the refrigerant gas from the second compressor means, wherein the electromagnetic three-way valve is operated such that the refrigerant gas compressed by the second compressor means is let to flow into the sealed casing when a refrigeration cycle load is equal to or higher than a predetermined value, thereby performing a parallel compression operation with use of the first and second compressor means, and the refrigerant gas compressed by the second compressor means is let to flow to the downstream side of the check valve when the refrigeration cycle load is lower than the predetermined value, thereby performing a two-stage compression operation in which compression is performed first by the first compressor means and then by the second compressor means.

* * * * *